United States Patent Office 2,908,688
Patented Oct. 13, 1959

2,908,688

5-METHYL-3-ISOXAZOLE CARBOXYLIC ACID HYDRAZIDES

Thomas Samuel Gardner, Rutherford, John Lee, Essex Fells, and Edward Wenis, Leonia, N.J., assignors to Hoffmann-La Roche Inc., Nutley, N.J., a corporation of New Jersey No Drawing. Application April 15, 1958
Serial No. 728,544

8 Claims. (Cl. 260—307)

This invention relates to isoxazole derivatives. More particularly, the invention relates to 1-monoalkyl- and 1 - monoaralkyl - 2 - (5 - methyl - 3 - isoxazolylcarbonyl)-hydrazines and to salts thereof.

The compounds of this invention may be represented by the following structural formula (I)   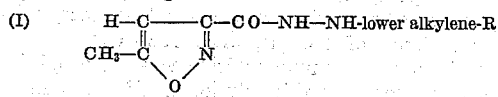

wherein R represents hydrogen, hydroxy, phenyl, alkoxyphenyl, alkylphenyl and halophenyl.

The lower alkylene group in Formula I refers to a straight chain or branched chain saturated hydrocarbon radical having a free bond available at each chain end for attachment to the nitrogen atom and to the substituent represented by R. The alkoxyphenyl groups represented by R in Formula I above are preferably lower alkoxyphenyl groups such as methoxyphenyl. The alkylphenyl groups are preferably lower alkylphenyl groups such as methylphenyl, isopropylphenyl, etc. Halophenyl groups represented by R include, for example, chlorophenyl, bromophenyl, etc. The alkyl groups attached to the $N^1$-nitrogen of the hydrazide group resulting when R represents hydrogen are preferably lower alkyl groups such as methyl, ethyl, propyl, isopropyl, n-butyl, n-amyl, isoamyl, etc. The analogous hydroxyalkyl groups when R represents hydroxy, include, for example, hydroxy-lower alkyl groups such as 2-hydroxyethyl.

The compounds of this invention which are represented by Formula I above may be produced by initially reacting 5-methyl-3-isoxazole carboxylic acid hydrazide with an aldehyde or ketone, preferably in an inert organic solvent such as ethanol, thereby producing an intermediate represented by the following formula (II)   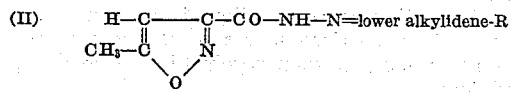

wherein R has the same significance as above.

The compound having the Formula II above is then reduced, e.g. with lithium aluminum hydride in ether or with sodium- or potassium borohydride in an aqueous alcohol, to produce the reduced compound of Formula I. The product may then be separated by conventional procedures such as removing the spent reducing agent and solvent extracting, distilling, precipitating, etc.

The term "lower alkylidene" used in Formula II above refers to a straight chain or branched chain hydrocarbon radical having a double bond at one end of the chain for attachment to the nitrogen atom of the hydrazide group and a single bond for attachment to the substituent represented by R.

Alternatively, an alkyl ester of 5-methyl-3-isoxazole carboxylic acid, e.g. ethyl 5-methyl-3-isoxazole carboxylate, may be reacted in an inert solvent with a mono-substituted hydrazine containing the desired substituent on the nitrogen atom to obtain the product represented by Formula I above.

The products of this invention represented by Formula I above form acid adidtion salts with various inorganic and organic acids. Such salts are also within the scope of this invention. Illustrative acid addition salts include the hydrohalides, e.g. hydrochloride, hydrobromide, hydroiodide, other mineral acid salts, e.g. sulfate, phosphate, nitrate and other acid salts such as tartrate, citrate, camphorsulfonate, ethanesulfonate, salicylate, ascorbate, malate, mandelate, etc. The hydrohalides, and in particular the hydrochloride, are preferred. The acid addition salts are prepared by reacting the base with the appropriate acid, preferably in an inert solvent with an excess of the acid present, and recovering the product by conventional means from the reaction mixture.

The compounds of this invention are amine oxidase inhibitors, that is, they inhibit the activity of amine oxidase which effects the deactivation of physiological regulators such as serotonin, tryptamine, epinephrine, etc., and stimulate the central nervous system. They are particularly useful for relief of disturbed states in psychotherapy. The bases having the Formula I, or pharmaceutically acceptable acid addition salts thereof, may be administered orally or parenterally in conventional solid or liquid dosage forms, such as tablets, capsules, injectables, etc., comprising therapeutic doses incorporated in conventional solid or liquid vehicles either with or without excipients.

The following examples are illustrative of the invention. All temperatures are in degrees centigrade and melting points are corrected.

*Example 1*

A 3-necked, 12-liter flask fitted with one high capacity condensers, two dropping funnels and an efficient stirrer was set up in such a manner that the reaction mixture could be cooled or heated. 25 g. of acetonylacetone, 88 ml. of concentrated nitric acid and 187 ml. of water was mixed and placed in the reaction flask. 325 g. of acetonylacetone was placed in one dropping funnel and a mixture of 1144 ml. of concentrated nitric acid with 2440 ml. of water was placed in the second dropping funnel. Oxidation was initiated by heating the solution in the flask. As soon as the initial reaction started to subside, the reactants were added at a rate of approximately 8 ml. per minute of acetonylacetone and 80 ml. per minute of dilute nitric acid.

After the final addition of the reactants, the mixture was cautiously stirred for a few minutes and the flask was gently heated. The mixture was refluxed for 30 minutes and cooled to −15°. The colorless crystals which precipitated were filtered off, washed twice with 250 ml. portions of ice water and dried at 60° over phosphorus pentoxide. The 5-methyl-3-isoxazole carboxylic acid sintered at 173° and melted at 175–176°.

*Example 2*

710 g. of 5-methyl-3-isoxazole carboxylic acid, 7.1 liters of ethanol, and 825 ml. of 96% sulfuric acid was mixed while agitating. The temperature of the liquid rose to 45–60°. Stirring was continued for 15 minutes and the solution was then permitted to stand for 24 hours. The esterification solution was concentrated at 60° under vacuum to a volume of 3.5 liters and poured into 10 liters of cracked ice. The solution was then neutralized with 1.8 liters of 28% ammonium hydroxide. The slightly alkaline solution was then extracted with ether in two portions of two liters each and then with ether in four portions of one liter each.

The six ether extracts were combined and concentrated under light vacuum to obtain crude ethyl 5-methyl-3-isoxazole carboxylate. The crude ester was then vacuum distilled at 13 to 14 mm. to obtain the pure ester, B.P. 115–117°.

*Example 3*

733 g. of ethyl 5-methyl-3-isoxazole carboxylate was dropped in at room temperature into 875 g. of 85% hydrazine hydrate. The internal temperature rose to 45–50°. The solution was stirred for four hours and then permitted to stand for 16 hours at 25°. The mixture was filtered and the mother liquor concentrated under vacuum to a solid. The combined yield of crude 5-methyl-3-isoxazole carboxylic acid hydrazide thus obtained was dissolved in 1.2 liters of hot ethanol. On cooling, a white crystalline product melting at 142–143° separated.

*Example 4*

32 g. of ethyl 5-methyl-3-isoxazole carboxylate in 200 ml. of isopropanol was treated with 9 g. of methyl hydrazine. After stirring and warming to 60° for one hour, the excess material was removed in vacuo. Upon addition of ethanol, 1-methyl-2-(5-methyl-3-isoxazolylcarbonyl)hydrazine crystallized, M.P. 93–94°.

*Example 5*

108 g. of acetaldehyde was added to 108 g. of 5-methyl-3-isoxazole carboxylic acid hydrazide in one liter of ethanol. The solution became warm and was permitted to stand overnight. An additional 50 g. of acetaldehyde was added to the solution and it was permitted to stand for 48 hours. On cooling, the product crystallized. The 1-ethylidene - 2 - (5 - methyl - 3 - isoxazolylcarbonyl)hydrazine thus obtained was recrystallized from ethanol, M.P. 159–160°.

62 g. of 1-ethylidene-2-(5-methyl-3-isoxazolylcarbonyl)hydrazine was slowly added as a dry powder over a period of two hours to 15 g. of lithium aluminum hydride in two liters of dry ether. The reaction mixture was stirred for four hours and permitted to stand overnight at 25°. The excess lithium aluminum hydride was decomposed with 150 ml. of ethyl acetate and 100 ml. of water was then added to decompose the complex. The solid was separated by filtration and the ether layer was concentrated to an oil. 50 ml. of methanol was added and the solution was decolorized with carbon. The product then crystallized. The 1-ethyl-2-(5-methyl-3-isoxazolylcarbonyl)hydrazine was recrystallized from methanol, M.P. 80–81°.

0.5 g. of 1-ethyl-2-(5-methyl-3-isoxazlylcarbonyl)hydrazine was dissolved in 15 ml. of ethanol. To this solution was added 2 ml. of a solution of hydrogen bromide in ethanol. Upon the addition of ether and cooling, 1-ethyl-2-(5-methyl-3-isoxazolylcarbonyl)hydrazine hydrobromide crystallized. Upon recrystallization from ethanol-ether, the hydrobromide melted at 147–149°.

0.5 g. of 1-ethyl-2-(5-methyl-3-isoxazolylcarbonyl)hydrazine was dissolved in 15 ml. of ethanol. 2 ml. of phosphoric acid were added to the solution. Ether was then added and the mixture was cooled. 1-ethyl-2-(5-methyl-3-isoxazolylcarbonyl)hydrazine phosphate separated as a syrup which did not crystallize.

0.5 g. of 1-ethyl-2-(5-methyl-3-isoxazolylcarbonyl)hydrazine was dissolved in 15 ml. of ethanol. To this solution was added 2 g. of tartaric acid. Ether was added and the mixture was cooled. 1-ethyl-2-(5-methyl-3-isoxazolylcarbonyl)hydrazine tartrate precipitated as an amorphous solid.

0.5 g. of 1-ethyl-2-(5-methyl-3-isoxazolylcarbonyl)hydrazine was dissolved in 15 ml. of ethanol. 2 g. of ascorbic acid was added to this solution. Upon the addition of ether and cooling, 1-ethyl-2-(5-methyl-3-isoxazolylcarbonyl)hydrazine ascorbate precipitated as an amorphous solid.

*Example 6*

100 g. of propionaldehyde was added to a solution of 100 g. of 5-methyl-3-isoxazole carboxylic acid hydrazide in 500 ml. of ethanol. The solution became warm and was permitted to stand overnight. The 1-propylidene-2-(5 - methyl - 3 - isoxazolylcarbonyl)hydrazine which had crystallized was separated by filtration and recrystallized from ethanol, M.P. 137–138°. 86 g. of 1-propylidene-2-(5-methyl-3-isoxazolylcarbonyl)hydrazine was reduced with 18 g. of lithium aluminum hydride as described in Example 5. The 1-propyl-2-(5-methyl-3-isoxazolylcarbonyl)hydrazine obtained was recrystallized from methanol, M.P. 48–50°.

0.5 g. of 1-propyl-2-(5-methyl-3-isoxazolylcarbonyl)hydrazine was dissolved in 15 ml. of ethanol. To this solution was added 2 ml. of nitric acid. Upon the addition of ether and cooling, 1-propyl-2-(5-methyl-3-isoxazolylcarbonyl)hydrazine nitrate crystallized. The compound was recrystallized from ethanol-ether, M.P. 114–116°.

*Example 7*

150 g. of 5-methyl-3-isoxazolyl carboxylic acid hydrazide in 1500 ml. of acetone was heated for 30 minutes at 56°. The solution was evaporated to 500 ml. and cooled. The product, 1-isopropylidene-2-(5-methyl-3-isoxazolylcarbonyl)hydrazine separated and was recrystallized from 500 ml. of acetone, M.P. 106–109°.

16 g. of lithium aluminum hydride was dissolved in 2.5 kg. of dry ether. To this solution at 5° was added 72 g. of dry powdered 1-isopropylidene-2-(5-methyl-3-isoxazolylcarbonyl)hydrazine, portionwise, over a period of one to two hours. After the last of the substituted hydrazine had been added, the solution was stirred for two hours and then permitted to stand overnight. The excess lithium aluminum hydride was decomposed with 250 ml. of ethyl acetate and then 150 ml. of water were added to decompose the complex. After stirring for two hours, the mixture was refluxed for two hours, filtered and the solid filter cake was extracted with one liter of boiling benzene. The ether and benzene solutions were combined and concentrated under vacuum to an oil which crystallized on cooling. The 1-isopropyl-2-(5-methyl-3-isoxazolylcarbonyl)hydrazine was decolorized with activated carbon and recrystallized twice from methanol, M.P. 85–87°.

1 - isopropyl-2-(5-methyl-3-isoxazolylcarbonyl)hydrazine was also prepared by adding 543 g. of 1-isopropylidene-2-(5-methyl-3-isoxazolylcarbonyl) hydrazine over a period of one hour to 114 g. of sodium borohydride in three liters of water at 25°. The temperature rose to 55°. After the last of the substituted hydrazine was added, the suspension was stirred for ½ hour and 100 ml. of acetic acid was added to destroy any excess sodium borohydride. The suspension was cooled, filtered and the recovered solid was recrystallized from methanol.

The procedure described in the preceding paragraph was repeated using potassium borohydride to obtain the same product.

*Example 8*

100 g. of 5-methyl-3-isoxazole carboxylic acid hydrazide was treated with 100 g. of butyraldehyde in 500 ml. of ethanol. The solution became hot and on cooling the product crystallized. The 1-butylidene-2-(5-methyl-3-isoxazolylcarbonyl)hydrazine was recrystallized from ethanol, M.P. 138–139°.

98 g. of 1 - butylidene-2-(5-methyl-3-isoxazolylcarbonyl)hydrazine was reduced with 18.5 g. of lithium aluminum hydride in ether according to the procedure described in Example 5. A gel was obtained which was extracted with benzene. The benzene extract was concentrated to an amorphous residue comprising 1-butyl-2-(5-methyl-3 - isoxazolylcarbonyl)hydrazine. The latter was dissolved in ethanol and ethanolic hydrogen chloride was added. 1-butyl-2-(5-methyl-3-isoxazolylcarbonyl)-hydrazine hydrochloride precipitated and was recrystallized from ethanol, M.P. 155–156°.

Example 9

To 70.5 g. of 5-methyl-3-isoxazole carboxylic acid hydrazide and 600 ml. of ethanol was added 50 g. of n-valeraldehyde. The condensation product, 1-n-amylidene-2-(5-methyl-3-isoxazolylcarbonyl)hydrazine, was recovered by filtration and recrystallized from ethanol, M.P. 114–115°. 46 g. of 1-n-amylidene-2-(5-methyl-3-isoxazolylcarbonyl)hydrazine was reduced with 8.5 g. of lithium aluminum hydride in ether. The product was recovered as described in Example 5. The free base, 1-n-amyl-2-(5-methyl-3-isoxazolylcarbonyl)hydrazine, was gummy and did not crystallize. Upon addition of ethanolic hydrogen chloride, crystalline 1-n-ampl-2-(5-methyl-3-isoxazolylcarbonyl)hydrazine hydrochloride separated. Upon recrystallization from ethanol, the colorless product melted at 155–157°.

Example 10

50 g. of isovaleraldehyde was added to 70.5 g. of 5-methyl-3-isoxazole carboxylic acid hydrazide in 600 ml. of ethanol. The product was recovered as described in Example 5 and crystallized from ethanol. The 1-isoamylidene-2-(5-methyl-3-isoxazolylcarbonyl)hydrazine melted at 125–126°.

71 g. of 1-isoamylidene-2-(5-methyl-3-isoxazolylcarbonyl)hydrazine was reduced with 13 g. of lithium aluminum hydride in ether as described in Example 5. The free base, 1-isoamyl-2-(5-methyl-3-isoxazolylcarbonyl)-hydrazine was gummy and did not crystallize. Upon addition of ethanolic hydrogen chloride, crystalline 1-isoamyl-2-(5-methyl-3-isoxazolylcarbonyl)hydrazine hydrochloride was obtained. Upon recrystallization from ethanol, the product melted at 185–186°.

Example 11

800 g. of benzaldehyde was added to a hot solution (75°) of 7 liters of ethanol containing 720 g. of 5-methyl-3-isoxazole carboxylic acid hydrazide. The solution was stirred for ten minutes at which time the product began to crystallize. On cooling at 4° for 14 hours, the solid was filtered off under vacuum and the solid filter cake was washed twice using 250 ml. of ice cold ethanol for each washing. The 1-benzylidene-2-(5-methyl-3-isoxazolylcarbonyl)hydrazine was recrystallized from ethanol, M.P. 199–200°.

115 g. of 1-benzylidene-2-(5-methyl-3-isoxazolylcarbonyl)hydrazine was added portionwise over the period of an hour to 5 liters of anhydrous ether containing 18.5 g. of lithium aluminum hydride. The reaction mixture was stirred for four hours and permitted to stand overnight. The excess lithium aluminum hydride was decomposed with 250 ml. of ethyl acetate and 150 ml. of water was added to decompose the complex. The solid was separated by filtration and the ether layer was concentrated to about 500 ml. 200 ml. of benzene was added to dehydrate the solution. Concentration was continued until a solid remained. The 1-benzyl-2-(5-methyl-3-isoxazolylcarbonyl)hydrazine was recrystallized from methanol, M.P. 105–106°.

1-benzyl-2-(5-methyl-3-isoxazolylcarbonyl)hydrazine hydrochloride was prepared by dissolving 40 g. of 1-benzyl-2-(5-methyl-3-isoxazolylcarbonyl)hydrazine in 400 ml. of boiling ethanol. To the solution was added 15 ml. of 10 N hydrogen chloride gas in ethanol. On cooling, 1-benzyl-2-(5-methyl-3-isoxazolylcarbonyl)hydrazine hydrochloride crystallized, M.P. 179–181°.

0.5 g. of 1-benzyl-2-(5-methyl-3-isoxazolylcarbonyl)-hydrazine was dissolved in 15 ml. of ethanol. To this solution was added 2 g. of oxalic acid. On addition of ether and cooling, 1-benzyl-2-(5-methyl-3-isoxazolylcarbonyl)hydrazine oxalate crystallized. The oxalate was recrystallized from ethanol-ether, M.P. 154–156°.

0.5 g. of 1-benzyl-2-(5-methyl-3-isoxazolylcarbonyl)hydrazine was dissolved in 15 ml. of ethanol. To this solution was added 2 ml. of phosphoric acid. On addition of ether and cooling, 1-benzyl-2-(5-methyl-3-isoxazolylcarbonyl)hydrazine phosphate separated as a syrup which did not crystallize.

0.5 g. of 1-benzyl-2-(5-methyl-3-isoxazolylcarbonyl)hydrazine was dissolved in 15 ml. of ethanol. 2 g. ascorbic acid was added to this solution. On addition of ether and cooling, 1-benzyl-2-(5-methyl-3-isoxazolylcarbonyl)hydrazine ascorbate precipitated as an amorphous solid.

Example 12

394 g. (2.8 mols) of methyl-5-methyl-3-isoxazolecarboxylate was placed in a 3-neck, round bottom flash fiteed with a stirrer and thermometer. 410 g. (3.35 mols, 20% excess) of benzyl hydrazine was added. The mixture was heated to 60°. Over a period of 25 minutes, intermittent heat was applied, until a temperature of 100° was attained. The reaction solution was stirred for four hours during which time crystallization took place. After standing overnight, the solid product was dissolved in 1200 ml. of boiling methanol. The methanol solution was cooled to —10°, filtered, and washed three times with 100 ml. portions of cold methanol.

The crude 1-benzyl-2-(5-methyl-3-isoxazolylcarbonyl)hydrazine was dissolved in 1500 ml. of boiling ethanol. 400 ml. of 10 N hydrogen chloride in ethanol was added slowly with cooling and stirring. The slurry was then diluted with 4 liters of ether and the suspension was filtered and washed three times with 200 ml. ether.

The hydrochloride salt thus formed was then sludged with three liters of water at 40° and 250 ml. of concentrated ammonium hydroxide was added. 500 g. of crushed ice was introduced to cool the batch. It was then filtered, washed two times with 200 ml. of water and recrystallized from 1500 ml. of methanol. The hot solution was filtered by gravity and cooled to —15°. The crystals were filtered, washed two times with 500 ml. of cold methanol and air dried overnight. The 1-benzyl-2-(5-methyl-3-isoxazolylcarbonyl)hydrazine melted at 105–107°.

Example 13

To a solution of 1700 ml. of methanol, 300 ml. of water, and 28 g. of 1-benzylidene-2-(5-methyl-3-isoxazolylcarbonyl)hydrazine, was added over a period of fifteen minutes 28 g. of potassium borohydride (KBH$_4$). The temperature rose to about 45–50°. The solution was stirred for one hour during which time a precipitate formed as the reaction solution cooled. After the reduction was completed, the excess KBH$_4$ was destroyed using 75 ml. of acetic acid. The entire contents of the reaction was evaporated to a solid and extracted by hot ether using 300 ml. for each extraction for a total of three extractions. The residue was then extracted with 200 ml. of boiling benzene. The ether extracts were combined, concentrated to a solid and crystallized from methanol.

The crude product thus obtained was purified by dissolving in 100 ml. of ethanol and adding 20 ml. 10 N hydrogen chloride in ethanol. On addition of 500 ml. of ether, 1-benzyl-2-(5-methyl-3-isoxazolylcarbonyl)hydrazine hydrochloride separated. The hydrochloride was recovered by filtration and washed with 100 ml. of ether.

The hydrochloride was dissolved in 100 ml. of water at 60°, filtered and cooled. 10 ml. of concentrated ammonium hydroxide were added and stirred for ten minutes. The free base, 1-benzyl-2-(5-methyl-3-isoxazolylcarbonyl)hydrazine was recovered by filtration and recrystallized from 50 ml. of methanol, M.P. 106–106.5°.

Example 14

100 g. of anisaldehyde and 100 g. of 5-methyl-3-isoxazole carboxylic acid in 800 ml. of ethanol was reacted as described in Example 5. The 1-p-methoxybenzylidene-2-(5-methyl-3-isoxazolylcarbonyl)hydrazine was recrystallized from ethanol, M.P. 187–188°.

130 g. of 1-p-methoxybenzylidene-2-(5-methyl-3-isoxazolylcarbonyl)hydrazine was reduced with 18 g. of lithium aluminum hydride as described in Example 5. The 1-(p-methoxybenzyl)-2-(5-methyl-3-isoxazolylcarbonyl)hydrazine was recrystallized from methanol, M.P. 88–89°.

The free base obtained above was dissolved in ethanol and ethanolic hydrogen chloride was added. Upon addition of ether, 1-(p-methoxybenzyl)-2-(5-methyl-3-isoxazolylcarbonyl)hydrazine hydrochloride crystallized. Upon recrystallization from ethanol-ether the product melted at 166–167° with dec.

*Example 15*

70.5 g. of 5-methyl-3-isoxazole carboxylic acid hydrazide in 800 ml. of ethanol was treated with 71 g. of o-chlorobenzaldehyde as described in Example 5. The 1-(o-chlorobenzylidene)-2-(5-methyl-3-isoxazolylcarbonyl)hydrazine was crystallized from ethanol, M.P. 172–173°.

158 g. of 1-(o-chlorobenzylidene)-2-(5-methyl-3-isoxazolylcarbonyl)hydrazine was reduced with 23 g. of lithium aluminum hydride in ether as described in Example 5. The 1-(o-chlorobenzyl)-2-(5-methyl-3-isoxazolylcarbonyl)hydrazine was recrystallized from ethanol, M.P. 100–101°.

*Example 16*

70 g. of 5-methyl-3-isoxazole carboxylic acid hydrazide was reacted with 100 g. of phenyl acetaldehyde in 500 ml. of ethanol as described in Example 5. The 1-phenethylidene-2-(5-methyl-3-isoxazolylcarbonyl)hydrazine was recrystallized from ethanol, M.P. 157–158°.

83 g. of 1-phenethylidene-2-(5-methyl-3-isoxazolylcarbonyl)hydrazine was reduced with 13 g. of lithium aluminum hydride and 5 liters of ether as described in Example 5. The free base, 1-phenethyl-2-(5-methyl-3-isoxazolylcarbonyl)hydrazine, was an amorphous product which did not crystallize. The free base was dissolved in ethanol and ethanolic hydrogen chloride was added. On cooling, 1-phenethyl-2-(5-methyl-3-isoxazolylcarbonyl)hydrazine hydrochloride crystallized. The hydrochloride was recrystallized from hot ethanol, M.P. 187–189°, with dec.

*Example 17*

A commercial sample of β-hydroxyethyl hydrazine, containing about 80% of the named compound, was fractionated. 40 g. of the relatively pure, β-hydroxyethyl hydrazine recovered from the fraction boiling at 155°–160°/30 mm. was heated at reflux with 78 g. of ethyl-5-methyl-3-isoxazole carboxylate and 100 ml. of isopropanol. The solution was concentrated to a small volume and ether was added. On standing at 4°, a few crystals separated. These crystals were used to seed a solution of the oil residue in alcohol-ether. 1-(2-hydroxyethyl)-2-(5-methyl-3-isoxazolylcarbonyl)hydrazine crystallized. The product was recrystallized once from ethanol and twice from hot water. It melted at 119–120°.

*Example 18*

48 g. of 5-methyl-3-isoxazole carboxylic acid hydrazide was reacted in 500 ml. of ethanol with 50 g. of p-isopropylbenzaldehyde at 25° for 14 hours as described in Example 5. The recovered solid, 1-(p-isopropylbenzylidene)-2-(5-methyl-3-isoxazolylcarbonyl)hydrazine, was recrystallized from ethanol, M.P. 170–172°.

65 g. of 1-(p-isopropylbenzylidene)-2-(5-methyl-3-isoxazolylcarbonyl)hydrazine was reduced in 5 liters of anhydrous ether using 9 g. of lithium aluminum hydride according to the procedure described in Example 5. The recovered product, 1-(p-isopropylbenzyl)-2-(5-methyl-3-isoxazolylcarbonyl)hydrazine was crystallized from methanol, M.P. 107–108°.

We claim:

1. A compound selected from the group consisting of bases represented by the formula $$\begin{array}{c} H-C\text{———}C-CO-NH\text{-lower alkylene-}R \\ \parallel \quad\quad \parallel \\ CH_3-C \quad\quad N \\ \diagdown \quad \diagup \\ O \end{array}$$

wherein R represents a member of the group consisting of hydrogen, hydroxy, phenyl, lower alkoxyphenyl, lower alkylphenyl and halophenyl—and pharmaceutically acceptable acid addition salts thereof.

2. A compound represented by the formula $$\begin{array}{c} H-C\text{———}C-CO-NH-NH\text{-lower alkylene-}\phi \\ \parallel \quad\quad \parallel \\ CH_3-C \quad\quad N \\ \diagdown \quad \diagup \\ O \end{array}$$

3. 1 - benzyl - 2 - (5 - methyl - 3 - isoxazolylcarbonyl) hydrazine.

4. Pharmaceutically acceptable acid addition salts of 1-benzyl-2-(5-methyl-3-isoxazolylcarbonyl)hydrazine.

5. 1-benzyl-2-(5-methyl - 3 - isoxazolylcarbonyl)hydrazine hydrochloride.

6. A member of the group consisting of compounds represented by the formula $$\begin{array}{c} H-C\text{———}C-CO-NH-N\text{=lower alkylidene-}R \\ \parallel \quad\quad \parallel \\ CH_3-C \quad\quad N \\ \diagdown \quad \diagup \\ O \end{array}$$

wherein R represents a member of the group consisting of hydrogen, hydroxy, phenyl, lower alkoxyphenyl, lower alkylphenyl and halophenyl.

7. A compound represented by the formula.

$$\begin{array}{c} H-C\text{———}C-CO-NH-N\text{=lower alkylidene-}\phi \\ \parallel \quad\quad \parallel \\ CH_3-N \quad\quad N \\ \diagdown \quad \diagup \\ O \end{array}$$

8. 1-benzylidene-2-(5 - methyl-3-isoxazolylcarbonyl)hydrazine.

References Cited in the file of this patent

UNITED STATES PATENTS 2,126,329     Hoffer                 Aug. 9, 1938

OTHER REFERENCES

Cusmano: Chem. Abstracts, vol. 34, p. 7903 (1940).
Speroni et al.: Chem. Abstracts, vol. 47, col. 11931 (1953).
Meltzer et al.: Chem. Abstracts, vol. 49, col. 1018 (1955).

UNITED STATES PATENT OFFICE

CERTIFICATE OF CORRECTION

Patent No. 2,908,688

October 13, 1959

Thomas Samuel Gardner et al

It is hereby certified that error appears in the printed specification of the above numbered patent requiring correction and that the said Letters Patent should read as corrected below.

Column 2, line 4, for "adidtion" read -- addition --; line 34, for "one" read -- two --; column 3, lines 59 and 60, for "seprated" read -- separated --; column 4, line 21, for "isoxazolyl" read -- isoxazole --; column 5, line 13, for "ampl" read -- amyl --; column 6, line 6, for "g. ascor-" read -- 2 g. of ascor- --; lines 14 and 15, for "flash teed" read -- flask fitted --; column 8, line 14, claim 1, for that portion of the formula reading "—CO—NH—" read -- —CO—NH—NH— --; line 43, after the word "formula" strike out the period; lines 45 to 48, claim 7, left-hand portion of the formula should appear as shown below instead of as in the patent:

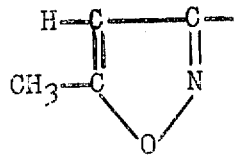

Signed and sealed this 19th day of April 1960.

(SEAL)
Attest:

KARL H. AXLINE
Attesting Officer

ROBERT C. WATSON
Commissioner of Patents